United States Patent
Li et al.

(10) Patent No.: US 10,918,024 B2
(45) Date of Patent: Feb. 16, 2021

(54) METHOD FOR SAFE PRODUCTION OF RICE SOIL MILDLY AND MODERATELY POLLUTED BY HEAVY METALS

(71) Applicant: GUANGDONG INSTITUTE OF ECO-ENVIRONMENTAL SCIENCE & TECHNOLOGY, Guangzhou (CN)

(72) Inventors: Fangbai Li, Guangzhou (CN); Chuanping Liu, Guangzhou (CN)

(73) Assignee: GUANGDONG INSTITUTE OF ECO-ENVIRONMENTAL CHINA SCIENCE & TECHNOLOGY (CN)

( * ) Notice: Subject to any disclaimer, the term of this patent is extended or adjusted under 35 U.S.C. 154(b) by 0 days.

(21) Appl. No.: 16/863,616

(22) Filed: Apr. 30, 2020

(65) Prior Publication Data
US 2020/0337255 A1 Oct. 29, 2020

Related U.S. Application Data

(63) Continuation of application No. PCT/CN2019/080477, filed on Mar. 29, 2019.

(30) Foreign Application Priority Data

Jul. 24, 2018 (CN) .......................... 201810816835.2

(51) Int. Cl.
| | |
|---|---|
| *A01G 22/22* | (2018.01) |
| *C05G 3/80* | (2020.01) |
| *A01C 21/00* | (2006.01) |
| *B09C 1/08* | (2006.01) |
| *C05B 7/00* | (2006.01) |
| *C05C 1/00* | (2006.01) |
| *C05C 5/04* | (2006.01) |
| *C09K 17/42* | (2006.01) |

(52) U.S. Cl.
CPC .............. *A01G 22/22* (2018.02); *A01C 21/00* (2013.01); *B09C 1/08* (2013.01); *C05B 7/00* (2013.01); *C05C 1/00* (2013.01); *C05C 5/04* (2013.01); *C05G 3/80* (2020.02); *C09K 17/42* (2013.01); *B09C 2101/00* (2013.01)

(58) Field of Classification Search
None
See application file for complete search history.

(56) References Cited

U.S. PATENT DOCUMENTS

| | | | |
|---|---|---|---|
| 6,254,656 B1* | 7/2001 | Noda ....................... | C05D 9/00 71/1 |
| 9,919,978 B2 | 3/2018 | Liu et al. | |
| 10,131,840 B2 | 11/2018 | Liu et al. | |
| 10,259,025 B2 | 4/2019 | Li et al. | |
| 10,351,769 B2 | 7/2019 | Li et al. | |
| 10,420,291 B2 | 9/2019 | Li et al. | |
| 10,633,588 B2 | 4/2020 | Liu et al. | |
| 2012/0198900 A1* | 8/2012 | Liu .......................... | C05G 5/20 71/62 |
| 2016/0289129 A1* | 10/2016 | Liu ......................... | A01N 59/02 |
| 2017/0282229 A1* | 10/2017 | Li ........................... | C09K 17/40 |
| 2018/0119008 A1* | 5/2018 | Liu .......................... | C05G 3/80 |
| 2018/0153109 A1* | 6/2018 | Li ............................ | C05D 9/00 |

FOREIGN PATENT DOCUMENTS

| | | | | |
|---|---|---|---|---|
| CN | 103789114 B | 8/2015 | | |
| CN | 105524623 A | 4/2016 | | |
| CN | 105713619 B | 2/2017 | | |
| CN | 105724428 B | 2/2017 | | |
| CN | 104388094 B | 4/2017 | | |
| CN | 105713617 B | 5/2017 | | |
| CN | 107216226 | * | 9/2017 | ............... C05G 3/04 |
| CN | 107880888 | * | 4/2018 | ............. C09K 17/40 |
| CN | 108031706 A | * | 5/2018 | ............. C09K 17/06 |
| CN | 109122136 A | | 1/2019 | |
| JP | 200295350 A | | 4/2020 | |
| WO | 2005110091 A1 | | 11/2005 | |

\* cited by examiner

*Primary Examiner* — Wayne A Langel
(74) *Attorney, Agent, or Firm* — The Webb Law Firm

(57) ABSTRACT

The present invention discloses a method for safe production of rice on soil mildly and moderately polluted by heavy metals. The method includes applying a passivator before transplanting rice seedlings to reduce activity of heavy metals in soil, and then spraying a foliar barrier from the peak tillering stage to the booting stage of rice and at the filling stage of rice; the passivator includes bentonite, gypsum powder, lime, a biochar, an iron-based biochar, a slow-release iron-based biochar, an iron-sulfur-silicon composite biochar, a heavy metal cadmium passivator and a cadmium-arsenic synchronous passivator for activating sulfur reducing bacteria in paddy soil; and the foliar barrier includes an acid silica sol, a selenium-silicon composite sol, a cerium composite silica sol, a ferrous modified selenium sol. The method can also include applying a nitrate nitrogen fertilizer at the seedling stage of rice, and/or applying a phosphorus potassium fertilizer at the tillering stage of rice.

9 Claims, No Drawings

METHOD FOR SAFE PRODUCTION OF RICE SOIL MILDLY AND MODERATELY POLLUTED BY HEAVY METALS

CROSS-REFERENCE TO RELATED APPLICATIONS

This application is a continuation of International Application No. PCT/CN2019/080477 filed Mar. 29, 2019, and claims priority to Chinese Patent Application No. 201810816835.2 filed Jul. 24, 2018, the disclosures of each of which are hereby incorporated by reference in their entireties.

FIELD OF THE INVENTION

The present invention belongs to the field of environmental protection, and particularly relates to a method for safe production of rice on soil mildly and moderately polluted by heavy metals.

BACKGROUND OF THE INVENTION

According to the National Soil Pollution Survey Bulletin jointly issued by the Ministry of Environmental Protection and the Ministry of Land and Resources in 2014, the overall situation of the soil environment in China is not optimistic; in some areas, soil pollution is heavy, and the quality of cultivated soil environment is worrying. The pollutants are mainly cadmium, arsenic and other inorganic heavy metal pollutants. The cultivated soil environment is related to the safety of people's "vegetable baskets" and "rice bags", the quality of agricultural products and human health, the economic and social development, and national ecological security, and thus it is a major livelihood and strategic issue. Rice is a crop that can easily absorb and accumulate heavy metals; and it is the largest food crop in China, more than 60% of the country's population taking rice as a staple food. Therefore, it is of great environmental and practical significance to study how to achieve safe production of rice on polluted rice fields.

The situation of more people and less land in our country determines that it is impossible to stop agricultural production for remediation of the large-area polluted cultivated land in our country. Besides, although the overall situation of soil pollution in China is not optimistic, most of the polluted soil is mild (or light) or moderate in the degree of pollution, which allows safe utilization of the China's polluted farmland. The "Action Plan for Soil Pollution Prevention and Control" (hereinafter referred to as "Soil Ten Measures") issued by the State Council in May 2016 listed classified management of agricultural land and guarantee of agricultural production environment safety as one of ten important tasks; a goal was set therein that by 2020 the safe utilization rate of polluted arable land would reach 90%, and the area of safely utilized mildly and moderately polluted arable land would reach 40 million mu. In recent years, due to the widespread public concern over soil pollution of cultivated land, it is particularly urgent to find a safe utilization way of heavy metal-polluted rice fields that is acceptable to farmers, affordable to the government, and developable to the industry.

So far there have been many researches on the remediation technology for heavy metal-polluted soil at home and abroad, but most of these researches focus on how to reduce the content of heavy metals in soil to a safe level. The technologies involved include chemical leaching, guest soil engineering, electric remediation, etc.; although these technologies can effectively reduce the content of heavy metals in soil, they often have higher costs, or damage the soil structure such that the soil productivity is affected, or have a higher risk of secondary pollution. In recent years, phytoremediation technology has received widespread attention because it has lower costs and is carried out in situ, such that it has no need to excavate and disturb the soil, has less impact on the surrounding environment, and does not damage the surrounding landscape, which is beneficial to the improvement of the ecological environment; however, the phytoremediation technology takes a long time in practical application, which requires occupation of agricultural time and interrupts or partially interrupts agricultural production. Therefore, none of the above-mentioned soil remediation technologies based on reducing the content of heavy metals in soil can meet the needs of China for the treatment of large-area mildly and moderately polluted arable land. For the treatment of heavy-metal polluted farmland soil, it is necessary to develop a technical system that is acceptable to farmers, affordable to the government, and developable to the industry.

With the improvement of understanding of the remediation of heavy metal-polluted farmland soil, the current treatment strategies for heavy metal-polluted farmland soil have shifted from reducing the content of heavy metals in soil in the past to focusing on the agricultural product safety. A treatment method that focuses on reducing the accumulation of heavy metals in agricultural products can be called an inhibition-control technology. In China, the research on the inhibition-control technology of heavy metal-polluted farmland soil is just in its infancy, and there is still a lack of mature technology system. The comparison of the inhibition-control technology for the heavy metals in paddy soil is focused on the passivation technology of heavy metals in soil. However, the content of heavy metals in rice is not only related to soil activity, but also related to factors such as the ability of heavy metals absorbed by rice roots to be transported to the part above ground and to be transported from vegetative organs to grains. In addition, rice has a long entire growth period, and also follows different laws of heavy-metal absorption and accumulation in different growth periods; passivating heavy metals in soil just before transplanting rice seedlings is often difficult to ensure that the activity of the heavy metals in soil is kept at a relatively low level throughout the growth period. Therefore, it is difficult to use a single technology to ensure the safe production of rice on soil mildly and moderately polluted by heavy metals.

Contents of the Invention

An object of the present invention is to overcome the shortcomings and deficiencies of the prior art and provide a method for safe production of rice on soil mildly and moderately polluted by heavy metals. Aiming at the early stage of vegetative growth of rice when the root system absorbs heavy metals from the soil solution and accumulates them in the vegetative organs, and at the middle and late stages when heavy metal elements are mainly transported and redistributed from vegetative organs to grains, this method starts from the entire growth period of rice, and provides a technical system for early control ("control") of the activity of heavy metals in soil and late inhibition ("inhibition") of transport of heavy metals, so as to ensure the safe production of rice on soil mildly and moderately polluted by heavy metals.

The object of the present invention is achieved through the following technical solution: A method for safe production of rice on soil mildly and moderately polluted by heavy metals is provided, comprising applying a passivator before transplanting rice seedlings to reduce the activity of heavy metals in soil, and then spraying a foliar barrier from the peak tillering stage to the booting stage of rice and at the filling stage of rice.

The soil polluted by heavy metals refers to the soil polluted by cadmium, lead and/or arsenic.

The selection of the passivator depends on factors such as the type of soil pollutants and the degree of pollution. It is preferably one or a mixture of the following components: bentonite, gypsum powder, lime, a biochar, an iron-based biochar, a slow-release iron-based biochar, a conditioner of iron-silicon-sulfur multi-element composite biochar for heavy metals in soil (an iron-sulfur-silicon composite biochar); a heavy metal cadmium passivator for activating sulfur reducing bacteria in paddy soil (prepared according to Chinese patent No. 201610119079.9 entitled "A Heavy Metal Cadmium Passivator for Activating Sulfur Reducing Bacteria in Paddy Soil and Application Thereof") and a cadmium-arsenic synchronous passivator.

The cadmium-arsenic synchronous passivator has three layers from the inside to the outside, each layer having an independent coating film; wherein the innermost layer is a hydrogen ion chemical consumer, the middle layer is a reaction accelerator humus substance, and the outermost layer is a mineralization precursor.

The mass ratio of the hydrogen ion chemical consumer to the reaction accelerator humus substance to the mineralization precursor is 1:(8-30):(1-10).

The hydrogen ion chemical consumer refers to a chemical agent that can consume hydrogen ions while being reduced in an oxidation-reduction reaction in a soil solution; it is preferably a nitrate and a peroxide, and more preferably a mixture of a nitrate and a peroxide in a mass ratio of (2-5):1.

The nitrate is one or more of sodium nitrate, potassium nitrate, magnesium nitrate, iron nitrate and calcium nitrate.

The peroxide is one or more of calcium peroxide, urea peroxide and zinc peroxide.

The reaction accelerator humus substance is one or more of peat soil, humic acid (HA), fulvic acid (FA), humin, ulmic acid and humus acid.

The mineralization precursor is reducing iron powder, a ferrous salt and/or a solid ferrous mineral; it is preferably a mixture of reducing iron powder, a ferrous salt and a solid ferrous mineral, and more preferably a mixture of reducing iron powder and a solid ferrous mineral in a mass ratio of 1:(1-5).

The solid ferrous mineral is one or more of siderite, vivianite, pyrite and magnetite.

The coating film is composed of a coating material (an alkaline coating material), which is prepared according to Example 1 in Chinese patent application No. 201610071104.0 entitled "Preparation and Use Method of Slow-Release Iron-Based Biochar Passivator for Heavy Metals in Soil".

The cadmium-arsenic synchronous passivator is preferably prepared by the following method:

(1) Adding a binder and water to the hydrogen ion chemical consumer, mixing them well, granulating, and drying to obtain a hydrogen ion consumer core material;

(2) coating the hydrogen ion consumer core material obtained in step (1) with a coating material to obtain a granulated hydrogen ion consumer;

(3) mixing the granulated hydrogen ion consumer obtained in step (2) with the reaction accelerator humus substance, and then adding the binder and water to mix well, granulating, and drying to obtain a two-layer core material of inner-layer hydrogen ion consumer and middle-layer reaction accelerator;

(4) coating the two-layer core material obtained in step (3) with a coating material to obtain a two-layer material (composed of the inner-layer hydrogen ion consumer and the middle-layer reaction accelerator);

(5) mixing the two-layer material obtained in step (4) with the mineralization precursor, then adding the binder and water to mix well, granulating, and drying to obtain a three-layer core material of cadmium-arsenic synchronous passivator; and (6) coating the three-layer core material of cadmium-arsenic synchronous passivator obtained in step (5) with a coating material to obtain a cadmium-arsenic synchronous passivator (having three coating films).

The particle size of the hydrogen ion consumer core material in step (1) is 2.5-3.5 mm.

The amount of the binder added in step (1) is equivalent to 3% to 5% (w/w) of the hydrogen ion chemical consumer.

The amount of water added in step (1) is equivalent to 50% to 60% (w/w) of the hydrogen ion chemical consumer.

The binder in steps (1), (3) and (5) is preferably a biological starch.

The biological starch is one or more of corn flour, sweet potato flour, potato flour and cassava flour.

In step (2), the mass-volume ratio of the hydrogen ion consumer core material to the coating material is 1:(0.3-1.2).

The thickness of the coating film formed by the coating material in steps (2), (4) and (6) is 0.5-1 mm.

The amount of the binder added in step (3) is equivalent to 3% to 5% (w/w) of the reaction accelerator humus substance.

The amount of water added in step (3) is equivalent to 50% to 60% (w/w) of the reaction accelerator humus substance.

The particle size of the two-layer core material of inner-layer hydrogen ion consumer and middle-layer reaction accelerator in step (3) is 4.5-6.5 mm.

In the step (3), the ratio of the hydrogen ion consumer to the reaction accelerator humus substance is 1:(8-30).

In step (4), the mass-volume ratio of the two-layer core material of inner-layer hydrogen ion consumer and middle-layer reaction accelerator to the coating material is 1:(0.3-1.2).

The amount of the binder added in step (5) is equivalent to 3% to 5% (w/w) of the mineralization precursor.

The amount of water added in step (5) is equivalent to 50% to 60% (w/w) of the mineralization precursor.

In step (5), the mass ratio of the two-layer material of inner-layer hydrogen ion consumer and middle-layer reaction accelerator to the mineralization precursor is (3-9):1.

The particle size of the three-layer core material of cadmium-arsenic synchronous passivator in step (5) is 8.5-10.5 mm.

In step (6), the mass-volume ratio of the three-layer core material of cadmium-arsenic synchronous passivator to the coating material is 1:(0.3-1.5), and preferably 1:(0.3-1.2).

The foliar barrier is one or more of an acidic silica sol (a pure silica sol), a selenium-doped nano silica sol (a selenium-silicon composite sol), a rare earth composite silica sol and a ferrous modified selenium sol.

The rare earth composite silica sol is preferably a cerium-doped inorganic nano silica sol (a cerium composite silica sol).

The ferrous modified selenium sol is prepared by the following method:

(a) Adding an iron-containing compound and a selenium-containing compound to water, and stirring and dissolving to obtain a mixed solution containing iron and selenium;

(b) adding a reductant to the mixed solution containing iron and selenium obtained in step (1) under the condition of a water bath at 35° C. to 85° C., stirring for 5-15 min, adding carbonate when no more precipitation is generated, continuing to stir for 5-15 min until no more precipitation is generated, filtering, and taking and washing the precipitation to obtain the precipitation of selenium element and ferrous carbonate;

(c) adding an emulsifier to a citric acid buffer solution to obtain an emulsified citric acid buffer solution;

(d) adding the precipitation of selenium element and ferrous carbonate obtained in step (b) to the emulsified citric acid buffer solution obtained in step (c) under the condition of a water bath at 25° C. to 55° C., and stirring well to obtain a sol system; and (e) evaporating to concentrate the sol system obtained in step (d), and adjusting the pH is to 4.5-8.5 to obtain a ferrous modified selenium sol, wherein the content of selenium element in the ferrous modified selenium sol is 0.25% to 2.5% (w/v), and the content of iron element is 2.5% to 7.5% (w/v).

The iron-containing compound in step (a) is one of an iron salt and a ferrous salt, or a mixture thereof.

The iron salt is preferably ferric chloride, ferric nitrate or ferric citrate.

The ferrous salt is preferably ferrous sulfate or ferrous chloride.

The selenium-containing compound in step (a) is one or more of selenic acid, selenate, seleninic acid and selenite, and preferably selenite.

The selenite is preferably sodium selenite.

In the mixed solution in step (a), the mass percentage of iron element is 5% to 15%, and the mass percentage of selenium element is 0.5% to 5%.

The temperature of the water bath in step (b) is preferably 45° C. to 55° C.

The reductant in step (b) is preferably ascorbic acid and/or reduced glutathione.

In step (b), the molar ratio of the reductant to the iron ions in the mixed solution is (1.4-3):1.

The washing in step (b) is carried out with deionized water; preferably, the washing is carried out 3-5 times with deionized water of 10-20 times in mass.

The carbonate in step (b) is preferably one or more of potassium carbonate, sodium carbonate, and ammonium carbonate.

In step (b), the molar ratio of the carbonate to the iron ions in the mixed solution is (1.0-2.0):1.

The emulsifier in step (c) is preferably one or more of Triton X-100, sodium alkylbenzenesulfonate, agricultural milk 400 and polyethylene glycol.

The amount of the emulsifier added in step (c) is calculated based on a mass-volume ratio of (1-10):100 of the emulsifier to the citric acid buffer solution.

The citric acid buffer solution in step (c) is a citric acid-potassium citrate buffer solution with a pH of 3.0-6.0 and a molar concentration of 0.01-0.1 mol/L. It is preferably obtained through the following steps:

(I) The citric acid ($C_6H_8O_7 \cdot H_2O$) is dissolved in deionized water to a volume of 1 L to obtain a citric acid solution, wherein the molar concentration of the citric acid solution is 0.01-0.1 mol/L;

(II) the potassium citrate ($C_6H_5K_3O_7$) is dissolved in deionized water to a volume of 1 L to obtain a potassium citrate solution, which has a molar concentration of 0.01-0.1 mol/L; and (III) the citric acid solution and the potassium citrate solution are mixed well to obtain a citric acid buffer solution, which has a pH of 3.0-6.0 and a molar concentration of 0.01-0.1 mol/L.

The stirring rate in step (d) is 50-100 r/min.

In step (d), the precipitation of selenium element and ferrous carbonate is preferably added by the following method: The precipitation of selenium element and ferrous carbonate is slowly and uniformly added to the emulsified citric acid buffer solution at such a controlled speed that the amount of precipitation added per liter of the solution is 5-10 g/min, until a uniform sol system is formed.

The amount of the added precipitation of selenium element and ferrous carbonate in step (d) is calculated based on a mass-volume ratio of 1:(10-100) of the precipitation of selenium element and ferrous carbonate to the emulsified citric acid buffer solution.

The pH range in step (e) is preferably 5.5-6.5.

The applying a passivator before transplanting rice seedlings refers to applying a passivator about 10 days before transplanting rice seedlings. This is preferably implemented via any of the following approaches:

(A) When the soil pollutants involved are cationic heavy metals such as cadmium and lead, the passivator is applied about 10 days before rice transplanting; the dosage of the passivator is as follows: when the pollutants exceed the standard by 1-2 times, the passivator is applied at 50-150 kg/mu; and when the pollutants exceed the standard by 2-3 times, the passivator is applied at 100-200 kg/mu; wherein the passivator is preferably one of lime, a biochar and the cadmium-arsenic synchronous passivator, or a mixture thereof;

(B) when the soil pollutants involved are arsenic, or arsenic combined with cadmium, lead, etc., the passivator is applied about 10 days before rice transplanting; the dosage of the passivator is as follows: when the pollutants exceed the standard by 1-2 times, the passivator is applied at 100-200 kg/mu; and when the pollutants exceed the standard by 2-3 times, the passivator is applied at 150-300 kg/mu; wherein the passivator is one of an iron-based biochar, a slow-release iron-based biochar, a conditioner of iron-silicon-sulfur multi-element composite biochar for heavy metals in soil (an iron-sulfur-silicon composite biochar) and a cadmium-arsenic synchronous passivator, or a mixture thereof.

The biochar in approach (A) is prepared according to the method for preparing a biochar material as described in Example 3 of the patent No. ZL201410538633.8; the heating process is controlled so that the prepared biochar has a pH of 9-11 and a specific surface area of 80 $cm^2$/g or more.

The specific surface area is preferably 110-150 $cm^2$/g.

In the cadmium-arsenic synchronous passivator in approach (A), the mass ratio of the hydrogen ion chemical consumer to the reaction accelerator humus substance to the mineralization precursor is 1:(8-15):(1-5).

In the cadmium-arsenic synchronous passivator in approach (B), the mass ratio of the hydrogen ion chemical consumer to the reaction accelerator humus substance to the mineralization precursor is 1:(15-30):(5-10).

The method for safe production of rice on soil mildly and moderately polluted by heavy metals also comprises topdressing at the seedling stage and/or the tillering stage of rice.

The topdressing is preferably implemented by the following method: A nitrate nitrogen fertilizer is applied at the seedling stage of rice at 10-30 kg/mu, and/or a phosphorus potassium fertilizer is applied at the tillering stage of rice at 10-20 kg/mu.

The nitrate nitrogen fertilizer is one of potassium nitrate, ammonium nitrate, sodium nitrate, calcium nitrate, a nitric phosphate fertilizer, calcium ammonium nitrate and a nitro compound fertilizer, or a mixture thereof.

The phosphorus potassium fertilizer is one of potassium dihydrogen phosphate, a calcium magnesium phosphate fertilizer, calcium phosphate and calcium superphosphate, or a mixture thereof.

The spraying a foliar barrier from the peak tillering stage to the booting stage of rice and at the filling stage of rice is preferably implemented via any of the following approaches:

(I) When the soil pollutants involved are cationic heavy metals such as cadmium and lead, the foliar barrier sprayed from the peak tillering stage to the booting stage of rice is an acidic silica sol (a pure silica sol) or a rare earth composite silica sol (capable of inhibiting the absorption of heavy metals by rice), and the foliar barrier sprayed at the filling stage of rice is a ferrous modified selenium sol;

(ii) when the soil pollutants involved are arsenic, or arsenic combined with cadmium, lead, etc., the foliar barrier sprayed from the peak tillering stage to the booting stage of rice is a selenium-doped nano silica sol (a selenium-silicon composite sol), and the foliar barrier sprayed at the filling stage of rice is a ferrous modified selenium sol.

The mass percentage of silica in the acidic silica sol (a pure silica sol) in approach (i) is 15% to 20%.

In the rare earth composite silica sol in approach (i), the mass percentage of silica is 5% to 10%, and the content of rare earth elements is 1% (w/w) or less; preferably, the mass percentage of silica is 5% to 10%, and the content of rare earth elements is 0.01% to 1% (w/w).

The rare earth elements include cerium, etc.

The rare earth composite silica sol in approach (i) is preferably a cerium-doped inorganic nano silica sol (a cerium composite silica sol).

In the ferrous modified selenium sol in approach (i), the content of selenium element is 0.25% to 0.5% (w/v), and the content of iron element is 5% to 7.5% (w/v).

The spraying dosage of the foliar barrier in approach (i) is 500-1000 ml/mu.

The method of spraying the foliar barrier in approach (i) is as follows: At or after 4 pm on a sunny or cloudy day, the foliar silicon barrier is diluted 100 times and then sprayed.

In the selenium-doped nano silica sol (a selenium-silicon composite sol) in approach (ii), the mass percentage of silica is 5% to 10%, and the content of selenium element is 1.5% to 2.5% (w/w).

In the ferrous modified selenium sol in approach (ii), the content of selenium element is 1.0% to 2.5% (w/v), and the content of iron element is 2.5% to 5% (w/v); preferably, the content of selenium element is 1.0% to 2% (w/v), and the content of iron element is 2.5% to 3.5% (w/v).

The spraying dosage of the foliar barrier in approach (ii) is 500-1000 ml/mu.

The method of spraying the foliar barrier in approach (ii) is as follows: At or after 4 pm on a sunny or cloudy day, the foliar silicon barrier is diluted 100 times and then sprayed.

The peak tillering stage mentioned in the present invention refers to a period when the tillering goes fastest.

The present invention has the following advantages and effects with respect to the prior art:

(1) Compared with the passivation technology that controls the activity of heavy metals in soil alone or the physiological barrier technology that inhibits the transport of heavy metals alone, the present invention "controls" the activity of heavy metals in soil during the vegetative growth period of rice, and "inhibits" the transport of heavy metals to the part above ground and grains during the reproductive growth period of rice, thereby jointly using "control" and "inhibition". Among them, "control" (during the vegetative growth period of rice) comprises applying a passivator before transplanting rice seedlings to reduce the activity of heavy metals in soil, and topdressing from the seedling stage to the tillering stage of rice to further control the activity of heavy metals; and "inhibition" (during the reproductive growth period of rice) comprises spraying a foliar barrier from the peak tillering stage to the booting stage of rice to inhibit the transport of heavy metals to the part above ground, and spraying a foliar barrier at the filling stage of rice to inhibit the transfer of heavy metals to grains. The synergistic technology of the present invention is far superior to the two single treatments, and is also significantly superior to the simple superposition of the two, thus guaranteeing the safe production of rice on soil mildly and moderately polluted by heavy metals.

(2) The present invention performs regulation according to the law of heavy metal absorption and accumulation by rice at different stages of the entire growth period of rice, and uses technical measures that have strong pertinence, significant effects, convenient application and cost-effectiveness, suitable for the safe utilization of large-area mildly and moderately polluted rice field in China.

(3) By combining "inhibition" and "control", the present invention can coordinately control the pollution of various heavy metals such as cadmium, arsenic and lead, and can be applied to rice fields polluted by combined heavy metals; besides, the passivator is preferably a biochar-based material, which has an effect of improving soil structure and a certain effect of increasing yield.

(4) Compared with other technologies, the present invention has a wide application range, and can be applied to rice fields polluted by a single heavy metal such as cadmium, arsenic and lead, as well as rice fields polluted by combined heavy metals; it can be applied to mildly and moderately polluted rice fields; and it can achieve the standard production on mildly and moderately polluted rice fields.

DETAILED DESCRIPTION OF THE EMBODIMENTS

The present invention will be further described in detail with reference to examples, but the embodiments of the present invention are not limited thereto.

1. The cadmium-arsenic synchronous passivator of the present invention has three layers from the inside to the outside, each layer having an independent coating film; wherein the innermost layer is a hydrogen ion chemical consumer, the middle layer is a reaction accelerator humus substance, and the outermost layer is a mineralization precursor.

The mass ratio of the hydrogen ion chemical consumer to the reaction accelerator humus substance to the mineralization precursor is 1:(8-30):(1-10).

The hydrogen ion chemical consumer refers to a chemical agent that can consume hydrogen ions while being reduced in an oxidation-reduction reaction in a soil solution; it is preferably a nitrate and a peroxide, and more preferably a mixture of a nitrate and a peroxide in a mass ratio of (2-5):1.

The nitrate is one or more of sodium nitrate, potassium nitrate, magnesium nitrate, iron nitrate and calcium nitrate.

The peroxide is one or more of calcium peroxide, urea peroxide and zinc peroxide.

The reaction accelerator humus substance is one or more of peat soil, humic acid (HA), fulvic acid (FA), humin, ulmic acid and humus acid.

The mineralization precursor is reducing iron powder, a ferrous salt and/or a solid ferrous mineral; it is preferably a mixture of reducing iron powder, a ferrous salt and a solid ferrous mineral, and more preferably a mixture of reducing iron powder and a solid ferrous mineral in a mass ratio of 1:(1-5).

The solid ferrous mineral is one or more of siderite, vivianite, pyrite and magnetite.

The coating film is composed of a coating material (an alkaline coating material), which was prepared according to Example 1 in Chinese patent application No. 201610071104.0 entitled "Preparation and Use Method of Slow-Release Iron-Based Biochar Passivator for Heavy Metals in Soil".

The cadmium-arsenic synchronous passivator involved in the example was specifically prepared by the following method:

(1) Weighing 100 g of potassium nitrate, 100 g of ferric nitrate, 50 g of calcium peroxide, and 50 g of urea peroxide, then adding 5 g of corn flour (Wuhan Jiangmin Huatai Pharmaceutical Chemical Co., Ltd.), 5 g of sweet potato flour (Wuhan Jiangmin Huatai Pharmaceutical Chemical Co., Ltd.), and 5 g of cassava flour (Hunan Xiang Li Lai Chemical Co., Ltd.), and then adding 150 mL of deionized water, mixing them well, granulating and air-drying while controlling the particle size to 3 mm, to obtain a hydrogen ion consumer core material;

(2) coating the hydrogen ion consumer core material with a coating material (chitosan with a pH of 9 and a mass fraction of 0.3%) according to a mass-volume ratio of 1:0.5 of the hydrogen ion consumer core material to the coating material, and meanwhile controlling the thickness of the coating film to 0.8 mm, to obtain an inner-layer hydrogen ion consumer with a film;

(3) adding 1.4 kg of peat soil (Zhongxiang Xuyao Technology Co., Ltd.), 100 g of humic acid (Sinopharm), 100 g of fulvic acid (Sinopharm), 400 g of humin (Sinopharm), 400 g of humus acid (Sinopharm), 24 g of corn flour, 24 g of sweet potato flour, 24 g of cassava flour, and 1.2 L of deionized water to the above inner-layer hydrogen ion consumer with a film, mixing well, granulating and drying while controlling the particle size to 5.5 mm, to obtain a two-layer core material of inner-layer hydrogen ion consumer and middle-layer reaction accelerator;

(4) coating the above two-layer core material of inner-layer hydrogen ion consumer and middle-layer reaction accelerator with a coating material (chitosan with a pH of 10 and a mass fraction of 2.5%) according to a mass-volume ratio of 1:0.5 of the core material to the coating material, and meanwhile controlling the thickness of the coating film to 0.8 mm, to obtain a two-layer material of inner-layer hydrogen ion consumer and middle-layer reaction accelerator;

(5) adding 100 g of reducing iron powder (CR grade, Sinopharm), 200 g of magnetite (CR grade, Sinopharm), 40 g of corn flour, 40 g of sweet potato flour, 40 g of cassava flour, and 3 L of deionized water to the above two-layer material of inner-layer hydrogen ion consumer and middle-layer reaction accelerator, mixing well, granulating and air-drying while controlling the particle size to 9.5 mm, to obtain a three-layer core material of cadmium-arsenic synchronous passivator; and (6) coating the three-layer core material of cadmium-arsenic synchronous passivator with a coating material (chitosan with a pH of 11 and a mass fraction of 5%) according to a mass-volume ratio of 1:0.5 of the core material to the coating material, and meanwhile controlling the thickness of the coating film to 0.8 mm, to obtain a cadmium-arsenic synchronous passivator with three coating films.

2. The ferrous modified selenium sol foliar barrier (a ferrous modified selenium sol) involved in the example of the present invention was prepared by the following method:

(1) Preparation of mixed solution containing iron and selenium: weighing 43.5 g of ferric chloride (containing 15 g of iron element) and 2 g of sodium selenite (containing 1 g of selenium element), adding 84.5 mL of deionized water thereto, stirring well, and fully dissolving to obtain a mixed solution containing iron and selenium;

(2) controlling the temperature at 35° C. in a water bath, and slowly adding 141 g of ascorbic acid to the above-mentioned mixed solution containing iron and selenium (the molar ratio of the added ascorbic acid to the iron ion in the mixed solution was 3:1) while stirring, and continuing stirring for 5 min after the addition; when pink precipitation was no longer produced, slowly adding 73.8 g of potassium carbonate (at a molar ratio of 2:1 to the iron ion in the mixed solution) while stirring, and continuing stirring for 5 min after the addition until no more precipitation was produced; filtering the precipitation and washing it 5 times with deionized water of 10 times in mass, to obtain a clean precipitation (about 33.07 g of a mixture of ferrous carbonate and selenium element);

(3) preparation of emulsified citric acid buffer solution: respectively weighing 21.01 g of citric acid ($C_6H_8O_7 \cdot H_2O$) and 30.64 g of potassium citrate ($C_6H_5K_3O_7$), and respectively fully dissolving them in deionized water to a volume of 1 L to obtain a citric acid solution and a potassium citrate solution; then respectively taking 930 mL of the citric acid solution and 70 mL of the potassium citrate solution, and thoroughly mixing them to obtain 1000 mL of a 0.1 mol/L citric acid buffer solution with a pH of 3.0; adding 50 g of polyethylene glycol and 50 g of sodium alkylbenzenesulfonate to the above buffer solution, and stirring well to obtain an emulsified citric acid buffer solution;

(4) slowly adding the precipitation obtained in step (2) to the emulsified citric acid solution obtained in step (3) at a rate of 5 g/min under the condition of a water bath at a temperature of 25° C. and a stirring rate of 50 r/min, and then continuing stirring for 10 min after the addition until a uniform sol system was formed; and (5) concentrating the sol by rotary evaporation to 200 mL, and adjusting its pH to 4.5 with potassium hydroxide, to obtain a ferrous modified selenium sol having an iron content of 7.5% (mass-volume ratio) and a selenium content of 0.5% (mass-volume ratio).

Example 1

The test site was located in a paddy field in Quantang Town, Xiangxiang City, Hunan Province. The soil in the paddy field was mildly polluted by cadmium. The topsoil (0-30 cm) of the field was collected for analysis, having a pH of 5.3 and a Cd content of 0.378 mg/kg.

The tested crop was rice of the variety Zhu-Liang-You. There were 7 treatments in the test respectively as follows:

(1) Blank control (CK);

(2) one-time applying lime as the base fertilizer at 100 kg/mu 10 days before transplanting rice seedlings ("control": single passivation treatment, recorded as T1);

(3) one-time applying lime at 50 kg/mu and biochar at 50 kg/mu as the base fertilizer 10 days before transplanting rice seedlings ("control": single passivation treatment, recorded as T2); wherein the biochar was prepared according to the method for preparing a biochar material in step (1) of Example 1 of the patent No. ZL201410538633.8 specifically as follows: drying some palm, and then weighing 10 kg of the palm and crushing it; putting the crushed palm in a high-temperature furnace and slowly raising the temperature to 200° C., and keeping the temperature constant at 200° C. for 2 h; then raising the temperature at a rate of 5° C./min until up to 800° C., and keeping the temperature constant at 800° C. for 3 h, and then stopping heating to obtain a biochar material; the biochar material had a pH of about 9.0, and a specific surface area of about 150 cm$^2$/g;

(4) one-time applying a biochar (prepared according to the method for preparing biochar material in Example 3 of the patent No. ZL201410538633.8 specifically as follows: drying some chaff, and then weighing 10 kg of the chaff and crushing it, putting the crushed chaff in a high-temperature furnace and slowly raising the temperature to 200° C., and keeping the temperature constant at 200° C. for 2 h, then raising the temperature at a rate of 5° C./min until up to 300° C., and keeping the temperature constant at 300° C. for 12 h, and then stopping heating to obtain the biochar material that having a pH of about 11 and a specific surface area of about 110 cm$^2$/g) at 100 kg/mu as the base fertilizer 10 days before transplanting rice seedlings; topdressing potassium dihydrogen phosphate once at 10 kg/mu at the tillering stage of rice ("control": passivation+topdressing treatment, recorded as T3);

(5) one-time applying a cadmium-arsenic synchronous passivator (i.e., the above-mentioned cadmium-arsenic synchronous passivator, in which the mass ratio of the hydrogen ion chemical consumer to the reaction accelerator humus substance to the mineralization precursor was 1:8:1) at 100 kg/mu as the base fertilizer 10 days before transplanting rice seedlings; topdressing calcium ammonium nitrate once at 10 kg/mu at the seedling stage of rice; topdressing potassium dihydrogen phosphate once at 10 kg/mu at the tillering stage of rice ("control": passivation+topdressing treatment, recorded as T4);

(6) spraying a pure silica sol (i.e., the acidic silica sol that was prepared according to the method in Example 1 of the patent No. Z201610119054.9, and finally adjusted to contain silica in a mass percentage of 15%) onto rice leaves from the peak tillering stage to the booting stage of rice, and spraying a ferrous modified selenium sol (i.e., the above ferrous modified selenium sol having an iron content of 7.5% (w/v) and a selenium content of 0.5% (w/v)) foliar barrier once at the filling stage of rice, the two sprays each having a dosage of 500 mL/mu and performed around 4 pm after the dilution with water by 100 times ("inhibition": spraying the barrier onto rice leaves, recorded as T5); and (7) one-time applying the cadmium-arsenic synchronous passivator at 100 kg/mu as the base fertilizer 10 days before transplanting rice seedlings; topdressing calcium ammonium nitrate once at 10 kg/mu at the seedling stage of rice; topdressing potassium dihydrogen phosphate once at 10 kg/mu at the tillering stage of rice; meanwhile, spraying a pure silica sol (same as T5) onto rice leaves from the peak tillering stage to the booting stage of rice, and spraying a ferrous modified selenium sol foliar barrier (same as T5) once at the filling stage of rice, the two sprays each having a dosage of 500 mL/mu and performed around 4 pm after the dilution with water by 100 times (a synergistic treatment of "inhibition" and "control": soil passivation+topdressing+spraying the barrier onto leaves, recorded as T6).

Each treatment was repeated four times in a random order; there were totally 28 test plots, each plot having an area of 5×4=20 m$^2$ and ensuring independent drainage and irrigation.

TABLE 1

Effects of different treatments on rice yield and cadmium accumulation in rice

|  | Yield (kg/mu) | Increase in yield (%) | Cadmium content in rice (mg/kg) | Decrease in cadmium content in rice (%) |
| --- | --- | --- | --- | --- |
| CK | 375.2 | 0 | 0.271 | 0 |
| T1 | 335.1 | −10.7 | 0.217 | 19.9 |
| T2 | 364.2 | −2.9 | 0.228 | 15.9 |
| T3 | 382.3 | 1.9 | 0.187 | 31.0 |
| T4 | 391.7 | 4.4 | 0.115 | 57.6 |
| T5 | 385.6 | 2.8 | 0.141 | 48.0 |
| T6 | 413.4 | 10.2 | 0.039 | 85.6 |

The results were shown in Table 1, indicating that different treatments could reduce the cadmium content in rice to different degrees. Among all the treatments, the synergistic treatment of "inhibition" and "control" (T6) achieved the lowest cadmium content in rice, which was only 0.039 mg/kg, 85.6% lower than that of the control; and only the synergistic treatment of "inhibition" and "control" (T6) achieved a significant increase in rice yield, which was 10.2%, reaching a significant level of difference compared with the control after a significance test. The treatment with lime alone (T1) could also achieve a reduced cadmium content in rice, which was 0.217 mg/kg, 19.9% lower than that of the control; however, this treatment had a significant effect on decreasing the rice yield, making the rice yield decreased by 10.7%. The cadmium content in rice treated with lime+biochar (T2) was 0.228 mg/kg, 15.9% lower than that of the control; the cadmium contents in rice treated with T1 and T2 were both higher than the food hygiene standard (cadmium in rice <0.2 mg/kg). Passivation+topdressing treatment (T3), "control" alone (T4), and "inhibition" alone (T5) could all decrease the cadmium content in rice to the food hygiene standard (cadmium in rice <0.2 mg/kg), and decreased the cadmium content in rice respectively by 31.0%, 57.6% and 48.0% compared with the control. The decrease rate of the cadmium content in rice synergistically treated with "inhibition" and "control" (T6) was significantly higher than that treated with "control" alone (T4) and "inhibition" alone (T5). Besides, the decrease rate of the cadmium content in rice synergistically treated with "inhibition" and "control" (T6) was also higher than the simple superposition effect of "control" alone (T4) and "inhibition" alone (T5). The simple superposition effect of "control" alone (T4) and "inhibition" alone (T5) on the decrease rate of the cadmium content in rice should be $C=[1-(100-C1)\times(100-C2)/100\times100]\times100$, where C1 is the percentage of cadmium decrease obtained by "inhibition" alone, and C2 is the percentage of cadmium decrease obtained by "control" alone. Based on this calculation, the simple superposition of "control" alone (T4) and "inhibition" alone (T5) should have decreased the cadmium content in rice by 78.0%; in contrast, the decrease rate of the cadmium content in rice synergistically treated by "inhibition" and "control" (T6) of the present invention reached 85.6%.

These showed that, compared with the passivation technology of controlling the activity of heavy metals in soil alone or the physiological barrier technology of inhibiting the transport of heavy metals alone, the technology of the present invention could achieve the synergistic effect of "inhibition" and "control", which was far better than the single treatments and also significantly better than the simple superposition of the two single treatments, thus allowing growth of qualified rice on the paddy soil mildly polluted.

Example 2

The test site was located in a paddy field in Gongzhuang Town, Huizhou City, Guangdong Province. The soil in the paddy field was moderately polluted by combined cadmium, arsenic and lead. The topsoil (0-30 cm) of the field was collected for analysis, having a pH of 5.61, a Cd content of 0.813 mg/kg, an As content of 49.4 mg/kg, and a Pb content of 193 mg/kg.

The tested crop was rice of the variety Huang-Li-Zhan. There were 7 treatments in the test respectively as follows:

(1) Blank control (CK);

(2) one-time applying a slow-release iron-based biochar (prepared according to Example 1 in Chinese patent No. ZL201610071104.0 entitled "Preparation and Use Method of Slow-Release Iron-Based Biochar Passivator for Heavy Metals in Soil") as the base fertilizer at 300 kg/mu 10 days before transplanting rice seedlings ("control": single passivation treatment, recorded as T1);

(3) one-time applying an iron-sulfur-silicon composite biochar (i.e., a conditioner of iron-silicon-sulfur multi-element composite biochar for heavy metals in soil, prepared according to Example 1 in Chinese patent No. ZL201610115576.1 entitled "Method for Preparing a Conditioner of Iron-Silicon-Sulfur Multi-Element Composite Biochar for Heavy Metals in Soil") at 300 kg/mu as the base fertilizer 10 days before transplanting rice seedlings ("control": single passivation treatment, recorded as T2);

(4) one-time applying an iron-based biochar (prepared according to the method in Example 2 of Chinese patent No. ZL201410538633.8 entitled "An Iron-Based Biochar Material, Its Preparation Process and Its Application in Soil Pollution Control") at 300 kg/mu as the base fertilizer 10 days before transplanting rice seedlings ("control": single passivation treatment, recorded as T3);

(5) one-time applying a slow-release iron-based biochar (same as T1) at 150 kg/mu and an iron-sulfur-silicon composite biochar (same as T2) at 150 kg/mu as the base fertilizer 10 days before transplanting rice seedlings; topdressing the nitro compound fertilizer once at 30 kg/mu at the seedling stage of rice; topdressing calcium superphosphate once at 20 kg/mu at the tillering stage of rice ("control": passivation+topdressing treatment, recorded as T4);

(6) spraying a selenium-silicon composite sol (i.e., a selenium-doped nano silica sol, which could inhibit the absorption and accumulation of heavy metals by rice and allow production of selenium-rich rice, and was prepared according to the method in Example 1 of Chinese invention patent No. ZL201310737996.X, with the final silica content controlled at 10% and selenium content at 2.5%) onto rice leaves from the peak tillering stage to the booting stage of rice, and spraying a ferrous modified selenium sol foliar barrier (prepared with reference to the preparation method of the ferrous modified selenium sol foliar barrier as mentioned above, with the sol system controlled to have an iron content of 5% (w/v) and a selenium content of 2.5% (w/v)) once at the filling stage of rice, the two sprays each having a dosage of 1000 mL/mu and performed around 4 pm after the dilution with water by 100 times ("inhibition": spraying the barrier onto rice leaves, recorded as T5); and (7) one-time applying a slow-release iron-based biochar (same as T1) at 150 kg/mu and an iron-sulfur-silicon composite biochar (same as T2) at 150 kg/mu as the base fertilizer 10 days before transplanting rice seedlings; topdressing the nitro compound fertilizer once at 30 kg/mu at the seedling stage of rice; topdressing calcium superphosphate once at 20 kg/mu at the tillering stage of rice; meanwhile, spraying a selenium-silicon composite sol (same as T5) onto rice leaves from the peak tillering stage to the booting stage of rice, and spraying a ferrous modified selenium sol foliar barrier (same as T5) once at the filling stage of rice, the two sprays each having a dosage of 1000 mL/mu and performed around 4 pm after the dilution with water by 100 times (a synergistic treatment of "inhibition" and "control": soil passivation+topdressing+spraying the barrier onto leaves, recorded as T6).

Each treatment was repeated four times in a random order; there were totally 28 test plots, each plot having an area of 5×4=20 m$^2$ and ensuring independent drainage and irrigation.

TABLE 2

Effects of different treatments on rice yield and accumulation of cadmium, arsenic and lead in rice

|  | Yield (kg/mu) | Increase in yield (%) | Cadmium content in rice (mg/kg) | Decrease in cadmium content in rice (%) | Content of inorganic arsenic in rice (mg/kg) | Decrease in arsenic content in rice (%) | Lead content in rice (mg/kg) | Decrease in lead content in rice (%) |
|---|---|---|---|---|---|---|---|---|
| CK | 417.2 | 0 | 0.405 | 0 | 0.274 | 0 | 0.315 | 0 |
| T1 | 441.2 | 5.8 | 0.215 | 46.9 | 0.187 | 31.8 | 0.227 | 27.9 |
| T2 | 435.7 | 4.4 | 0.223 | 44.9 | 0.177 | 35.4 | 0.211 | 33.0 |
| T3 | 445.4 | 6.8 | 0.227 | 44.0 | 0.179 | 34.7 | 0.214 | 32.1 |
| T4 | 448.7 | 7.6 | 0.209 | 48.4 | 0.157 | 42.7 | 0.185 | 41.3 |
| T5 | 421.5 | 1.0 | 0.237 | 41.5 | 0.198 | 27.7 | 0.217 | 31.1 |
| T6 | 455.8 | 9.3 | 0.102 | 74.8 | 0.089 | 67.5 | 0.104 | 67.0 |

The results were shown in Table 2, indicating that different treatments could reduce the contents of cadmium, inorganic arsenic and lead in rice to different degrees. Compared with the control (CK), the content of cadmium in rice treated by T1, T2, T3, T4, T5 and T6 decreased by 46.9%, 44.9%, 44.0%, 48.4%, 41.5% and 74.8%, respectively; the content of inorganic arsenic in rice decreased by 31.8%, 35.4%, 34.7%, 42.7%, 27.7% and 67.5%, respectively; and the content of lead in rice decreased by 27.9%, 33.0%, 32.1%, 41.3%, 31.1% and 67.0%, respectively. Among all the treatments, the synergistic treatment of "inhibition" and "control" (T6) achieved the lowest contents of cadmium, inorganic arsenic and lead in rice, which were only 0.102 mg/kg, 0.089 mg/kg and 0.104 mg/kg, respectively; and only the synergistic treatment of "inhibition" and "control" (T6) could decrease the contents of cadmium, inorganic arsenic and lead in rice to the food hygiene standard (cadmium in rice <0.2 mg/kg, inorganic arsenic in rice <0.2 mg/kg, lead in rice <0.2 mg/kg), and achieve a significant increase in rice yield, which was 9.3%, reaching a significant level of difference compared with the control after a significance test. "Control" alone (T4) could decrease the contents of inorganic arsenic and lead in rice to the food hygiene standard (inorganic arsenic in rice <0.2 mg/kg, lead in rice <0.2 mg/kg), but the cadmium content in rice was still higher than the food hygiene standard (cadmium in rice [[>]]<0.2 mg/kg). The contents of cadmium and lead in rice treated by "inhibition" alone (T5) were both higher than the food hygiene standard (cadmium in rice [[>]]<0.2 mg/kg, lead in rice <0.2 mg/kg). Calculated according to the formula in Example 1, the effects of the simple superposition of "control" alone (T4) and "inhibition" alone (T5) on decreasing the contents of cadmium, inorganic arsenic and lead in rice should be 69.8%, 58.6% and 59.5, respectively; in contrast, the decrease rates of cadmium, inorganic arsenic and lead in rice synergistically treated by "inhibition" and "control" (T6) of the present invention reached 74.8%, 67.5% and 67.0%, respectively.

These showed that, compared with the passivation technology of controlling the activity of heavy metals in soil alone or the physiological barrier technology of inhibiting the transport of heavy metals alone, the present invention adopted the synergistic treatment of "inhibition" and "control" to coordinately control the pollution of various heavy metals such as cadmium, arsenic and lead, which achieved an effect that was far better than the single treatments and also significantly better than the simple superposition of the two single treatments, thus allowing growth of qualified rice on the paddy soil moderately polluted by combined cadmium, arsenic and lead.

Example 3

The test site was located in a moderately polluted paddy field in Zhangshi Town, Qujiang District, Shaoguan City, Guangdong Province. The soil in the paddy field had a pH of 5.32, and a total Cd content of 0.645 mg/kg.

The tested crop was rice of the variety Mei-Xiang-Zhan. There were 7 treatments in the test respectively as follows:

(1) Blank control (CK);

(2) one-time applying bentonite and gypsum powder each at 75 kg/mu as the base fertilizer 10 days before transplanting rice seedlings ("control": single passivation treatment, recorded as T1);

(3) one-time applying bentonite and kaolinite each at 75 kg/mu as the base fertilizer 10 days before transplanting rice seedlings ("control": single passivation treatment, recorded as T2);

(4) one-time applying a cadmium-arsenic synchronous passivator (prepared with reference to the preparation method of the cadmium-arsenic synchronous passivator as mentioned above, with the mass ratio of the hydrogen ion chemical consumer to the reaction accelerator humus substance to the mineralization precursor controlled at 1:15:5) at 150 kg/mu as the base fertilizer 10 days before transplanting rice seedlings; topdressing calcium superphosphate once at 20 kg/mu at the tillering stage of rice ("control": passivation+topdressing treatment, recorded as T3);

(5) one-time applying a cadmium-arsenic synchronous passivator (same as T3) at 150 kg/mu as the base fertilizer 10 days before transplanting rice seedlings; topdressing potassium nitrate once at 30 kg/mu at the seedling stage of rice; topdressing the calcium magnesium phosphate fertilizer once at 20 kg/mu at the tillering stage of rice ("control": passivation+topdressing treatment, recorded as T4);

(6) spraying a cerium composite silica sol (i.e., a cerium-doped inorganic nano silica sol that was prepared according to the method in Example 1 of Chinese invention patent No. ZL200610036994.8, wherein after dialysis of the silica sol and the cerium dioxide sol, the pH was adjusted to 7.0, and the silica sol with a solid content of 10% and the cerium dioxide sol with a solid content of 1% were mixed at a volume ratio of 1:1, thus obtaining a cerium-silicon composite sol) onto rice leaves from the peak tillering stage to the booting stage of rice, and spraying a ferrous modified selenium sol foliar barrier (prepared with reference to the preparation method of the ferrous modified selenium sol foliar barrier as mentioned above, with the sol system controlled to have an iron content of 5% (w/v) and a selenium content of 0.25% (w/v)) once at the filling stage of rice, the two sprays each having a dosage of 1000 mL/mu and performed around 4 pm after the dilution with water by 100 times ("inhibition": spraying the barrier onto rice leaves, recorded as T5); and (7) one-time applying the cadmium-arsenic synchronous passivator at 150 kg/mu as the base fertilizer 10 days before transplanting rice seedlings; topdressing potassium nitrate once at 30 kg/mu at the seedling stage of rice; topdressing the calcium magnesium phosphate fertilizer once at 20 kg/mu at the tillering stage of rice; meanwhile, spraying a pure cerium-silicon composite sol (same as T5) onto rice leaves from the peak tillering stage to the booting stage of rice, and spraying a ferrous modified selenium sol foliar barrier (same as T5) once at the filling stage of rice, the two sprays each having a dosage of 1000 mL/mu and performed around 4 pm after the dilution with water by 100 times (a synergistic treatment of "inhibition" and "control": soil passivation+topdressing+spraying the barrier onto leaves, recorded as T6).

Each treatment was repeated four times in a random order; there were totally 28 test plots, each plot having an area of 5×4=20 m² and ensuring independent drainage and irrigation.

TABLE 3

Effects of different treatments on rice yield and cadmium accumulation in rice

| | Yield (kg/mu) | Increase in yield (%) | Cadmium content in rice (mg/kg) | Decrease in cadmium content in rice (%) |
|---|---|---|---|---|
| CK | 354.2 | 0 | 0.393 | 0 |
| T1 | 312.3 | −11.8 | 0.248 | 36.9 |
| T2 | 321.7 | −9.2 | 0.254 | 35.4 |
| T3 | 364.1 | 2.8 | 0.241 | 38.7 |

TABLE 3-continued

Effects of different treatments on rice
yield and cadmium accumulation in rice

|   | Yield (kg/mu) | Increase in yield (%) | Cadmium content in rice (mg/kg) | Decrease in cadmium content in rice (%) |
|---|---|---|---|---|
| T4 | 371.2 | 4.8 | 0.228 | 42.0 |
| T5 | 369.7 | 4.4 | 0.251 | 36.1 |
| T6 | 391.5 | 10.5 | 0.137 | 65.1 |

The results were shown in Table 3, indicating that different treatments could reduce the cadmium content in rice to different degrees; compared with the control (CK), the content of cadmium in rice treated by T1, T2, T3, T4, T5 and T6 decreased by 36.9%, 35.4%, 38.7%, 42.0%, 36.1% and 65.1%, respectively. Among all the treatments, the synergy of "inhibition" and "control" (T6) achieved the lowest cadmium content in rice, which was only 0.137 mg/kg; only the synergistic treatment of "inhibition" and "control" (T6) could decrease the content of cadmium in rice to the food hygiene standard (cadmium in rice <0.2 mg/kg), and achieve a significant increase in rice yield, which was 10.5%, reaching a significant level of difference compared with the control after a significance test. The cadmium contents in rice treated with "control" alone (T4) and "inhibition" alone (T5) were both higher than the food hygiene standard (cadmium in rice <0.2 mg/kg). Calculated according to the formula in Example 1, the effect of the simple superposition of "control" alone (T4) and "inhibition" alone (T5) on decreasing the content of cadmium in rice should be 62.9%; in contrast, the decrease rate of the cadmium content in rice synergistically treated by "inhibition" and "control" (T6) of the present invention reached 65.1%. Therefore, the effect of the synergistic treatment of "inhibition" and "control" (T6) on decreasing the content of cadmium in rice was significantly higher than those of "control" alone (T4) and "inhibition" alone (T5), and also higher than that of the simple superposition of "control" alone (T4) and "inhibition" alone (T5).

These showed that, compared with the passivation technology of controlling the activity of heavy metals in soil alone or the physiological barrier technology of inhibiting the transport of heavy metals alone, the synergistic technology achieved an effect that was far better than the single treatments and also significantly better than the simple superposition of the two single treatments, and only when "inhibition" and "control" were synergistically used could qualified rice be produced on paddy soil moderately polluted by cadmium.

Example 4

The test site was located in a paddy field moderately polluted by combined cadmium and arsenic in Hongxing Village, Dongtang Town, Renhua County, Shaoguan City, Guangdong Province. The topsoil (0-30 cm) of the field was collected for analysis, having a pH of 5.86, a Cd content of 1.85 mg/kg, and an As content of 38.20 mg/kg.

The tested crop was rice of the variety Wu-Feng-You 615. There were 4 treatments in the test respectively as follows:

(1) Blank control (CK);

(2) one-time applying an iron-sulfur-silicon composite biochar (i.e., a conditioner of iron-silicon-sulfur multi-element composite biochar for heavy metals in soil, prepared according to Example 1 in Chinese patent No. ZL201610115576.1 entitled "Method for Preparing a Conditioner of Iron-Silicon-Sulfur Multi-Element Composite Biochar for Heavy Metals in Soil") at 150 kg/mu as the base fertilizer 10 days before transplanting rice seedlings; topdressing ammonium nitrate once at 30 kg/mu at the seedling stage of rice; topdressing calcium phosphate once at 20 kg/mu at the tillering stage of rice ("control": passivation+topdressing treatment, recorded as T1);

(3) spraying a selenium-silicon composite sol (i.e., a selenium-doped nano silica sol, which could inhibit the absorption and accumulation of heavy metals by rice and allow production of selenium-rich rice, and was prepared according to the method in Example 1 of Chinese invention patent No. ZL201310737996.X, with the final silica content controlled at 5% and selenium content at 1.5%) onto rice leaves from the peak tillering stage to the booting stage of rice, and spraying a ferrous modified selenium sol foliar barrier (prepared with reference to the preparation method of the ferrous modified selenium sol foliar barrier as mentioned above, with the sol system controlled to have an iron content of 2.5% (w/v) and a selenium content of 1.0% (w/v)) once at the filling stage of rice, the two sprays each having a dosage of 1000 mL/mu and performed around 4 pm after the dilution with water by 100 times ("inhibition": spraying the barrier onto rice leaves, recorded as T2); and (4) one-time applying an iron-sulfur-silicon composite biochar (same as T1) at 150 kg/mu as the base fertilizer 10 days before transplanting rice seedlings; topdressing ammonium nitrate once at 30 kg/mu at the seedling stage of rice; topdressing calcium phosphate once at 20 kg/mu at the tillering stage of rice; meanwhile, spraying a selenium-silicon composite sol (i.e., a selenium-doped nano silica sol, which could inhibit the absorption and accumulation of heavy metals by rice and allow production of selenium-rich rice, and was prepared according to the method in Example 1 of Chinese invention patent No. ZL201310737996.X, with the final silica content controlled at 5% and selenium content at 1.5%) onto rice leaves from the peak tillering stage to the booting stage of rice, and spraying a ferrous modified selenium sol foliar barrier (prepared with reference to the preparation method of the ferrous modified selenium sol foliar barrier as mentioned above, with the sol system controlled to have an iron content of 2.5% (w/v) and a selenium content of 1.0% (w/v)) once at the filling stage of rice, the two sprays each having a dosage of 1000 mL/mu and performed around 4 pm after the dilution with water by 100 times (a synergistic treatment of "inhibition" and "control": soil passivation+topdressing+spraying the barrier onto leaves, recorded as T3).

Each treatment was repeated four times in a random order; there were totally 16 test plots, each plot having an area of 5×4=20 m² and ensuring independent drainage and irrigation.

TABLE 4

Effects of different treatments on rice yield and accumulation
of cadmium and inorganic arsenic in rice

|   | Yield (kg/mu) | Increase in yield (%) | Cadmium content in rice (mg/kg) | Decrease in cadmium content in rice (%) | Content of inorganic arsenic in rice (mg/kg) | Decrease in arsenic content in rice (%) |
|---|---|---|---|---|---|---|
| CK | 472.3 | 0 | 0.615 | 0 | 0.237 | 0 |
| T1 | 481.5 | 1.9 | 0.387 | 37.1 | 0.156 | 34.2 |
| T2 | 479.7 | 1.6 | 0.425 | 30.9 | 0.187 | 21.1 |
| T3 | 501.2 | 6.1 | 0.187 | 69.6 | 0.081 | 65.8 |

The results were shown in Table 4, indicating that different treatments could reduce the contents of cadmium and inorganic arsenic in rice to different degrees. Compared with the control, the content of cadmium in rice treated by T1, T2 and T3 decreased by 37.1%, 30.9% and 69.6%, respectively; and the content of inorganic arsenic in rice decreased by 34.2%, 21.1% and 65.8%, respectively. Among all the treatments, the synergistic treatment of "inhibition" and "control" (T3) achieved the lowest contents of cadmium and inorganic arsenic in rice, which were only 0.187 mg/kg and 0.081 mg/kg, respectively; only the synergistic treatment of "inhibition" and "control" (T3) could decrease the contents of cadmium and inorganic arsenic in rice to the food hygiene standard (cadmium in rice <0.2 mg/kg, inorganic arsenic in rice <0.2 mg/kg). The cadmium contents in rice treated with "control" alone (T1) and "inhibition" alone (T2) were both higher than the food hygiene standard (cadmium in rice <0.2 mg/kg). Calculated according to the formula in Example 1, the effects of the simple superposition of "control" alone (T1) and "inhibition" alone (T2) on decreasing the contents of cadmium and inorganic arsenic in rice should be 56.5% and 48.1%, respectively; in contrast, the decrease rate of the cadmium and inorganic arsenic content in rice synergistically treated by "inhibition" and "control" (T3) of the present invention reached 69.6% and 65.8%, respectively. Therefore, the effect of the synergistic treatment of "inhibition" and "control" (T3) on decreasing the content of cadmium in rice was significantly higher than those of "control" alone (T1) and "inhibition" alone (T2), and also higher than that of the simple superposition of "control" alone (T1) and "inhibition" alone (T2).

This showed that, compared with the passivation technology of controlling the activity of heavy metals in soil alone or the physiological barrier technology of inhibiting the transport of heavy metals alone, the synergistic technology could coordinately control cadmium and arsenic and achieve an effect that was far better than the single treatments and also significantly better than the simple superposition of the two single treatments, and only when "inhibition" and "control" were synergistically used could qualified rice be produced on paddy soil moderately polluted by combined cadmium and arsenic.

Example 5

The test site was located in a paddy field polluted by cadmium in Tongxi Village, Shuitou Town, Fogang County, Qingyuan City, Guangdong Province. The topsoil (0-30 cm) of the field was collected for analysis, having a pH of 4.58, a Cd content of 2.86 mg/kg, and an As content of 22.6 mg/kg. This plot is a typical paddy field moderately polluted by cadmium due to mining.

The tested crop was rice of the variety Tian-You 998. There were 5 treatments in the test respectively as follows:

(1) Blank control (CK);

(2) one-time applying a cadmium-arsenic synchronous passivator (prepared with reference to the preparation method of the cadmium-arsenic synchronous passivator as mentioned above, with the mass ratio of the hydrogen ion chemical consumer to the reaction accelerator humus substance to the mineralization precursor controlled at 1:15:5) at 150 kg/mu as the base fertilizer 10 days before transplanting rice seedlings ("control": passivation treatment, recorded as T1);

(3) one-time applying a cadmium-arsenic synchronous passivator (prepared with reference to the preparation method of the cadmium-arsenic synchronous passivator as mentioned above, with the mass ratio of the hydrogen ion chemical consumer to the reaction accelerator humus substance to the mineralization precursor controlled at 1:30:10) at 150 kg/mu as the base fertilizer 10 days before transplanting rice seedlings ("control": passivation treatment, recorded as T2);

(4) spraying a selenium-silicon composite sol (i.e., a selenium-doped nano silica sol, which could inhibit the absorption and accumulation of heavy metals by rice and allow production of selenium-rich rice, and was prepared according to the method in Example 1 of Chinese invention patent No. ZL201310737996.X, with the final silica content controlled at 7.5% and selenium content at 2.0%) onto rice leaves from the peak tillering stage to the booting stage of rice, and spraying a ferrous modified selenium sol foliar barrier (prepared with reference to the preparation method of the ferrous modified selenium sol foliar barrier as mentioned above, with the sol system controlled to have an iron content of 3.5% (w/v) and a selenium content of 2.0% (w/v)) once at the filling stage of rice, the two sprays each having a dosage of 1000 mL/mu and performed around 4 pm after the dilution with water by 100 times ("inhibition": spraying the barrier onto rice leaves, recorded as T3); and (5) one-time applying a cadmium-arsenic synchronous passivator (same as T2) at 150 kg/mu 10 days before transplanting rice seedlings; meanwhile, spraying a selenium-silicon composite sol (same as T3) onto rice leaves from the peak tillering stage to the booting stage of rice, and spraying a ferrous modified selenium sol foliar barrier (same as T3) once at the filling stage of rice, the two sprays each having a dosage of 1000 mL/mu and performed around 4 pm after the dilution with water by 100 times (a synergistic treatment of "inhibition" and "control": soil passivation+spraying the barrier onto leaves, recorded as T4).

Each treatment was repeated four times in a random order; there were totally 20 test plots, each plot having an area of 5×4=20 m² and ensuring independent drainage and irrigation.

TABLE 5

Effects of different treatments on rice yield and accumulation of cadmium and inorganic arsenic in rice

|    | Yield (kg/mu) | Increase in yield (%) | Cadmium content in rice (mg/kg) | Decrease in cadmium content in rice (%) | Content of inorganic arsenic in rice (mg/kg) | Decrease in arsenic content in rice (%) |
|----|---------------|----------------------|--------------------------------|-----------------------------------------|---------------------------------------------|----------------------------------------|
| CK | 438           | —                    | 0.586                          | —                                       | 0.322                                       |                                        |
| T1 | 489           | 11.6                 | 0.361                          | 38.4                                    | 0.251                                       | 22.0                                   |
| T2 | 501           | 14.4                 | 0.371                          | 36.7                                    | 0.236                                       | 26.7                                   |
| T3 | 478           | 9.1                  | 0.384                          | 34.5                                    | 0.263                                       | 18.3                                   |
| T4 | 531           | 21.2                 | 0.183                          | 68.8                                    | 0.173                                       | 46.3                                   |

The results were shown in Table 5, indicating that different treatments could reduce the contents of cadmium and inorganic arsenic in rice to different degrees. Compared with the control, the content of cadmium in rice treated by T1, T2, T3 and T4 decreased by 38.4%, 36.7%, 34.5% and 68.8%, respectively; and the content of inorganic arsenic in rice decreased by 22.0%, 26.7%, 18.3% and 46.3%, respectively. Among all the treatments, the synergistic treatment of "inhibition" and "control" (T4) achieved the lowest contents of cadmium and inorganic arsenic in rice, which were only 0.183 mg/kg and 0.173 mg/kg, respectively; only the synergistic treatment of "inhibition" and "control" (T4) could decrease the contents of cadmium and inorganic arsenic in rice to the food hygiene standard (cadmium in rice <0.2 mg/kg, inorganic arsenic in rice <0.2 mg/kg). The cadmium contents in rice treated with "control" alone (T1, T2) and "inhibition" alone (T3) were both higher than the food hygiene standard (cadmium in rice <0.2 mg/kg). Calculated according to the formula in Example 1, the effects of the simple superposition of "control" alone (T1) and "inhibition" alone (T3) on decreasing the contents of cadmium and inorganic arsenic in rice should be 59.6% and 36.3%, respectively; in contrast, the decrease rate of the cadmium and inorganic arsenic content in rice synergistically treated by "inhibition" and "control" (T4) of the present invention reached 68.8% and 46.3%, respectively. Therefore, the effect of the synergistic treatment of "inhibition" and "control" (T4) on decreasing the content of cadmium in rice was significantly higher than those of "control" alone (T1) and "inhibition" alone (T3), and also higher than that of the simple superposition of "control" alone (T1) and "inhibition" alone (T3).

The above examples are preferred embodiments of the present invention, but the embodiments of the present invention are not limited thereto, and any other alterations, modifications, replacements, combinations and simplifications made without departing from the spirit and principle of the present invention should all be equivalent substitutions and included in the scope of protection of the present invention.

The invention claimed is:

1. A method for safe production of rice on soil mildly and moderately polluted by heavy metals, wherein: the method comprises applying a passivator before transplanting rice seedlings to reduce activity of heavy metals in soil, and then spraying a foliar barrier from a peak tillering stage to a booting stage of rice and at a filling stage of rice;
    wherein the passivator is a cadmium-arsenic synchronous passivator;
    the cadmium-arsenic synchronous passivator has three layers from the inside to the outside, each layer having an independent coating film; wherein the innermost layer is a hydrogen ion chemical consumer, the middle layer is a reaction accelerator humus substance, and the outermost layer is a mineralization precursor;
    the hydrogen ion chemical consumer is a nitrate and a peroxide;
    the reaction accelerator humus substance is one or more of peat soil, humic acid, fulvic acid, humin, ulmic acid and humus acid; and
    the mineralization precursor is reducing iron powder, a ferrous salt and/or a solid ferrous mineral.

2. The method of claim 1, wherein: the method also comprises topdressing at the seedling stage and/or the tillering stage of rice.

3. The method of claim 2, wherein: the topdressing at the seedling stage and/or the tillering stage of rice is implemented by the following method:
    a nitrate nitrogen fertilizer is applied at the seedling stage of rice at 10-30 kg/mu, and/or a phosphorus fertilizer is applied at the tillering stage of rice at 10-20 kg/mu;
    the nitrate nitrogen fertilizer is at least one member selected from the group consisting of potassium nitrate, ammonium nitrate, sodium nitrate, calcium nitrate, a nitric phosphate fertilizer, calcium ammonium nitrate and a nitro compound fertilizer; and
    the phosphorus fertilizer is at least one member selected from the group consisting of potassium dihydrogen phosphate, a calcium magnesium phosphate fertilizer, calcium phosphate and calcium superphosphate.

4. The method of claim 1, wherein:
    the foliar barrier is at least one member selected from the group consisting of an acidic silica sol, a selenium-doped nano silica sol, a rare earth composite silica sol and a ferrous modified selenium sol.

5. The method of claim 1, wherein:
    the mass ratio of the hydrogen ion chemical consumer to the reaction accelerator humus substance to the mineralization precursor is 1:(8-30):(1-10);
    the hydrogen ion chemical consumer is a mixture of the nitrate and the peroxide in a mass ratio of (2-5):1;
    the nitrate is at least one member selected from the group consisting of sodium nitrate, potassium nitrate, magnesium nitrate, iron nitrate and calcium nitrate;
    the peroxide is at least one member selected from the group consisting of calcium peroxide, urea peroxide and zinc peroxide;
    the mineralization precursor is a mixture of reducing iron powder and a solid ferrous mineral in a mass ratio of 1:(1-5); and
    the solid ferrous mineral is at least one member selected from the group consisting of siderite, vivianite, pyrite and magnetite.

6. The method of claim 1, wherein: the applying a passivator before transplanting rice seedlings is implemented via any of the following approaches:
    (A) when the soil pollutants involved are cadmium and/or lead, the passivator is applied 10 days before rice transplanting at the following dosage: when the pollutants exceed a standard by 1-2 times, the passivator is applied at 50-150 kg/mu; and when the pollutants exceed the standard by 2-3 times, the passivator is applied at 100-200 kg/mu; wherein the passivator is at least one member selected from the group consisting of lime, a biochar and the cadmium-arsenic synchronous passivator; in the cadmium-arsenic synchronous passivator, the mass ratio of the hydrogen ion chemical consumer to the reaction accelerator humus substance to the mineralization precursor is 1:(8-15):(1-5);
    (B) when the soil pollutants involved are arsenic, or arsenic combined with cadmium and lead, the passivator is applied 10 days before rice transplanting at the following dosage: when the pollutants exceed the standard 1-2 times, the passivator is applied at 100-200 kg/mu; and when the pollutants exceed the standard by 2-3 times, the passivator is applied at 150-300 kg/mu; wherein the passivator is at least one member selected from the group consisting of an iron-based biochar, a slow-release iron-based biochar, a conditioner of iron-silicon-sulfur multi-element composite biochar for heavy metals in soil and a cadmium-arsenic synchronous passivator; in the cadmium-arsenic synchronous passivator, the mass ratio of the hydrogen ion chemical consumer to the reaction accelerator humus substance to the mineralization precursor is 1:(15-30):(5-10).

7. The method of claim 4, wherein: the ferrous modified selenium sol is prepared by:
    (a) adding an iron-containing compound and a selenium-containing compound to water, and stirring and dissolving to obtain a mixed solution containing iron and selenium;
    (b) adding a reductant to the mixed solution containing iron and selenium obtained in step (1) under the condition of a water bath at 35° C. to 85° C., stirring for 5-15 min, adding carbonate when no more precipitation is generated, continuing to stir for 5-15 min until no more precipitation is generated, filtering, and taking and washing the precipitation to obtain the precipitation of selenium element and ferrous carbonate;

(c) adding an emulsifier to a citric acid buffer solution to obtain an emulsified citric acid buffer solution;

(d) adding the precipitation of selenium element and ferrous carbonate obtained in step (b) to the emulsified citric acid buffer solution obtained in step (c) under the condition of a water bath at 25° C. to 55° C., and stirring well to obtain a sol system; and (e) evaporating to concentrate the sol system obtained in step (d), and adjusting the pH is to 4.5-8.5 to obtain a ferrous modified selenium sol, wherein the content of selenium element in the ferrous modified selenium sol is 0.25% to 2.5% (w/v), and the content of iron element is 2.5% to 7.5% (w/v).

8. The method of claim 7, wherein :

the iron-containing compound described in step (1) is at least one member selected from the group consisting of iron salts and ferrous salts;

the selenium-containing compound described in step (a) is at least one member selected from the group consisting of selenic acid, selenate, seleninic acid and selenite;

the reductant described in step (b) is at least one member selected from the group consisting of ascorbic acid and reduced glutathione;

the carbonate described in step (b) is at least one member selected from the group consisting of potassium carbonate, sodium carbonate, and ammonium carbonate;

the citric acid buffer solution described in step (c) is a citric acid-potassium citrate buffer solution with a pH of 3.0-6.0 and a molar concentration of 0.01-0.1 mol/L; and the emulsifier described in step (c) is at least one member selected from the group consisting of Triton X-100, sodium alkylbenzenesulfonate, agricultural milk 400 and polyethylene glycol.

9. The method of claim 7, wherein: the spraying a foliar barrier from the peak tillering stage to the booting stage of rice and at the filling stage of rice is implemented via any of the following approaches:

(i) when the soil pollutants involved are cadmium and/or lead, the foliar barrier sprayed from the peak tillering stage to the booting stage of rice is an acidic silica sol or a rare earth composite silica sol, and the foliar barrier sprayed at the filling stage of rice is a ferrous modified selenium sol; the mass percentage of silica in the acidic silica sol is 15% to 20%; the mass percentage of silica in the rare earth composite silica sol is 5% to 10%, and the content of rare earth elements is 1% (w/w) or less; the content of selenium element in the ferrous modified selenium sol is 0.25% to 0.5% (w/v), and the content of iron element is 5% to 7.5% (w/v);

(ii) when the soil pollutants involved are arsenic, or arsenic combined with cadmium and lead, the foliar barrier sprayed from the peak tillering stage to the booting stage of rice is a selenium-doped nano silica sol, and the foliar barrier sprayed at the filling stage of rice is a ferrous modified selenium sol; the mass percentage of silica in the selenium-doped nano silica sol is 5% to 10%, and the content of selenium element is 1.5% to 2.5% (w/w); the content of selenium element in the ferrous modified selenium sol is 1.0% to 2.5% (w/v), and the content of iron element is 2.5% to 5% (w/v).

* * * * *

UNITED STATES PATENT AND TRADEMARK OFFICE
CERTIFICATE OF CORRECTION

PATENT NO. : 10,918,024 B2
APPLICATION NO. : 16/863616
DATED : February 16, 2021
INVENTOR(S) : Fangbai Li et al.

Page 1 of 1

It is certified that error appears in the above-identified patent and that said Letters Patent is hereby corrected as shown below:

On the Title Page

Item (54) and in the Specification, Column 1, Title, Line 2, after "RICE" insert -- ON --

Item (73), Column 1, Assignee, Line 2, After "ECO-ENVIRONMENTAL" delete "CHINA"

In the Claims

Column 21, Line 45, Claim 1, delete "one or more" and insert -- at least one member selected from the group consisting --, therefor Column 22, Line 44, Claim 6, before "1-2" insert -- by --

Column 23, Line 18, Claim 8, delete "(1)" and insert -- (a) --

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*